United States Patent [19]
Cipres

[11] 3,945,667
[45] Mar. 23, 1976

[54] HIGH-RIDE CONVERSION MEMBER FOR CONVENTIONAL BICYCLES

[75] Inventor: Henry A. Cipres, Los Angeles, Calif.
[73] Assignee: L. A. Emergency Oxygen, Inc., Los Angeles, Calif.
[22] Filed: Mar. 5, 1975
[21] Appl. No.: 555,692

[52] U.S. Cl. ............... 280/7.15; 280/261; 280/287
[51] Int. Cl.² ........................................... B62K 3/02
[58] Field of Search .......... 280/7.15, 261, 278, 287, 280/259, 7.1

[56] References Cited
UNITED STATES PATENTS

| | | | |
|---|---|---|---|
| 2,482,472 | 9/1949 | Fried | 280/261 |
| 2,929,641 | 3/1960 | Alvistur | 280/7.1 X |
| 3,408,090 | 10/1968 | Fritz et al. | 280/287 X |
| 3,659,878 | 5/1972 | Carter | 280/7.15 |

*Primary Examiner*—Kenneth H. Betts
*Attorney, Agent, or Firm*—Lindenberg, Freilich, Wasserman, Rosen & Fernandez

[57] ABSTRACT

A conventional bicycle of the type having a frame with an upper bar between an upright seat-supporting member and a steering fork bearing assembly is converted to a high-ride bicycle by a bifurcated seat extension having a housing for a pedal sprocket bearing assembly on the end of one branch which extends forwardly along the upper bar. Clamping means secures the forwardly extending branch to the upper bar. A downwardly extending branch is clamped in the bicycle frame in the place of the seat, and the seat is clamped in place at the upper end of the seat extension.

3 Claims, 2 Drawing Figures

U.S. Patent   March 23, 1976   3,945,667
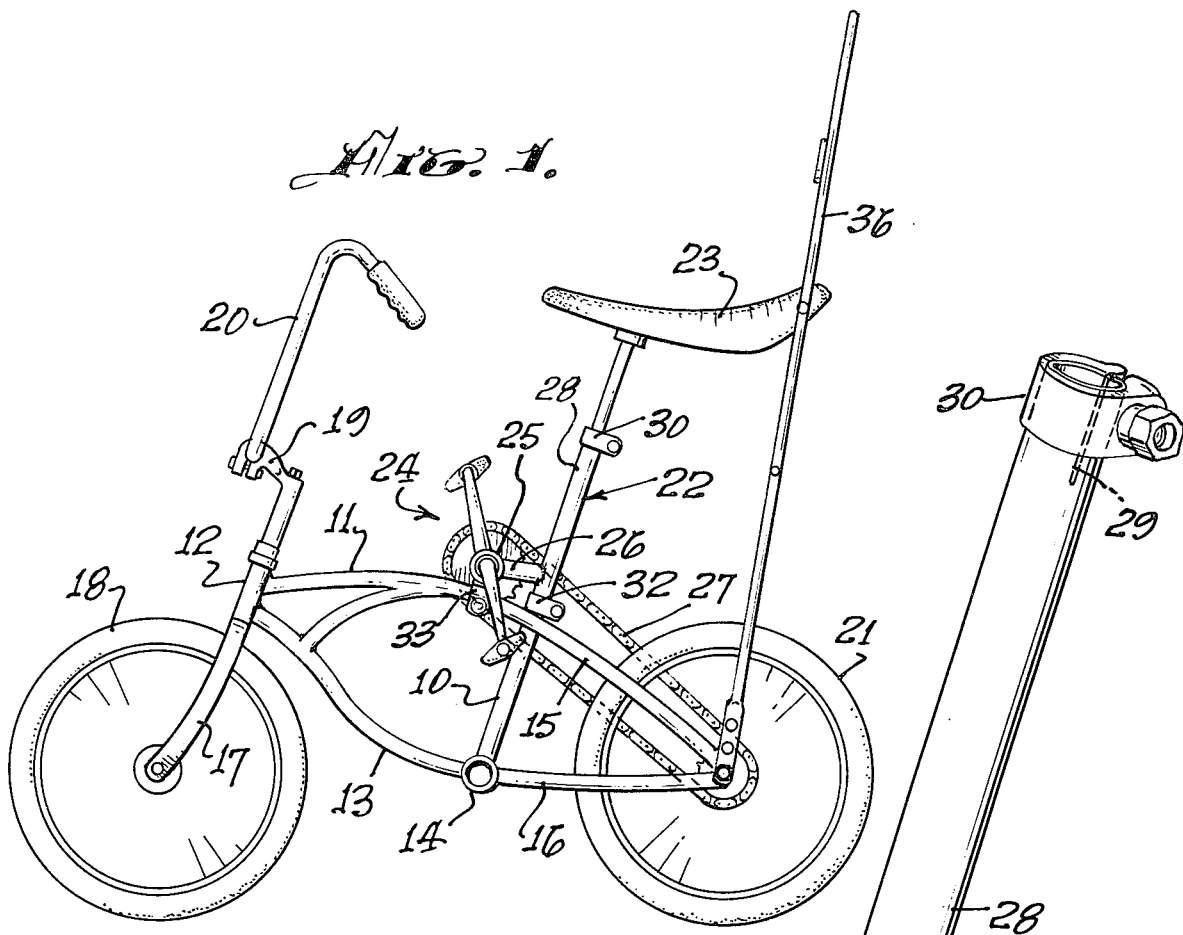
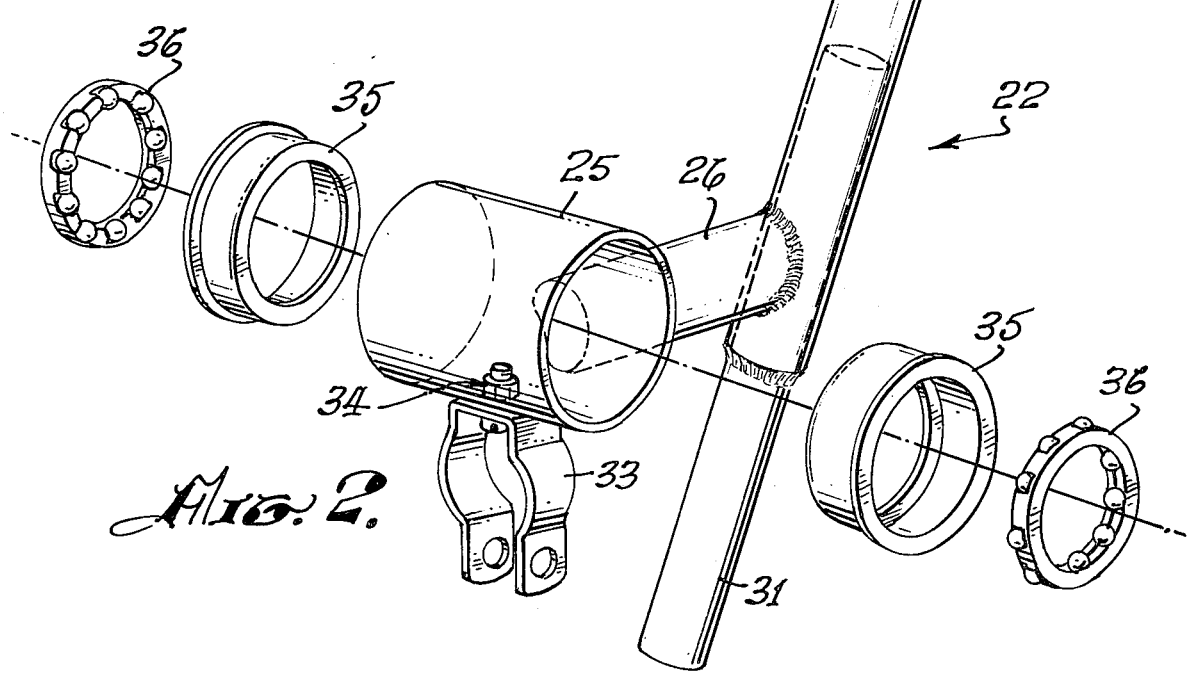

HIGH-RIDE CONVERSION MEMBER FOR CONVENTIONAL BICYCLES

BACKGROUND OF THE INVENTION

This invention relates to bicycles, and more particularly to a bifurcated seat extension for converting a standard bicycle to a high-ride bicycle.

A conventional bicycle of the type having a horizontal upper bar in the frame has a hollow center member connected at the bottom to a housing for a pedal sprocket bearing assembly and connected at the top to that upper bar. That center member is open at the top to receive a seat post. A lower bar extends from the sprocket bearing housing to an upright housing for a steering fork bearing assembly. A steering fork supports the front end of the frame on the axle of a wheel. Upper and lower rear forks support the rear end of the frame on the axle of a second wheel.

The seat post is usually long enough to provide some height adjustment. Once the height has been adjusted, contractible clamping means secure the seat at the selected position. Similar but more limited height adjustment can usually be made by vertically positioning a gooseneck fitting post that secures the handle bar to the steering fork. However, the seat adjustment that is made possible by a long seat post is limited to the length of the rider's legs. Consequently, for conversion to a high-ride or elevated bicycle, something more than just seat and handle bar adjustment is required.

Arrangements for converting a bicycle to a high-ride bicycle have heretofore involved inverting the conventional frame to place the housing for the pedal sprocket bearing assembly at the top, as shown in U.S. Pat. Nos. 3,113,785, and 3,659,878. Such arrangements are unsatisfactory because they result in an awkward looking bicycle, and create complications in securing the seat to the housing for the pedal sprocket bearing assembly.

SUMMARY OF THE INVENTION

In accordance with the present invention, a bifurcated seat extension member is provided for converting a conventional bicycle of the type having a frame with an upper bar between an upright seat-supporting member and a housing for a steering fork bearing assembly to a high-ride bicycle. The seat extension is comprised of a hollow cylindrical member having a contractible clamping means around its upper end and a post at its lower end. The post is adapted to fit into the upright seat-supporting member and to be secured by a contractible clamping means. A branch extends forwardly from the hollow cylindrical member along the upper bar of the bicycle frame. A housing for a pedal sprocket bearing assembly is secured to the end of the branch, and the branch and housing structure is secured to the upper bar by suitable clamping means, preferably at the bottom of the housing. The conventional sprocket bearing assembly is transferred to the housing at the end of the branch and the conventional seat post is inserted into the upper end of the cylindrical member. Addition of a few links may be required in the bicycle chain to reach around the sprocket in the new high-ride position.

The novel features that are considered characteristic of this invention are set forth with particularity in the appended claims. The invention will best be understood from the following description when read in conjunction with the accompanying drawings.

BRIEF DESCRIPTION OF THE DRAWINGS

FIG. 1 is a side view of a standard bicycle converted to a high-ride bicycle with a bifurcated seat extension member of the present invention.

FIG. 2 is an exploded isometric view of the bifurcated seat extension member showing pedal sprocket bearing assemblies to be inserted in a housing to support the pedal sprocket in a high-ride position.

DESCRIPTION OF THE PREFERRED EMBODIMENTS

Referring to FIG. 1, a standard bicycle frame is shown comprised of an upright center member 10, an upper bar 11 connected between the upright member and a housing 12 for a steering fork bearing assembly, a lower bar 13 connected between a housing 14 for a pedal sprocket bearing assembly, and rear forks 15 and 16. A steering fork 17 is supported on the axle of the front wheel 18 and is connected to a gooseneck member 19 to which a high-rise handle bar 20 is connected. The frame is supported in the rear on the axle of wheel 21. All of this is conventional, including the high-rise handle bar 20 in common use.

To permit the rider to ride higher on the bicycle, a bifurcated seat extension member 22 supports a bicycle seat 23 on the frame. The pedal sprocket bearing assembly 24 of the standard bicycle is transferred to a housing 25 at the end of a branch 26 of the bifurcated seat extension. A chain 27 made long enough to fit around the pedal sprocket in its new position is then added. This chain may be the standard chain made longer by adding a few links.

FIG. 2 illustrates the bifurcated seat extension member 22 in an isometric view. It is comprised of a hollow cylindrical member 28 having an internal diameter just large enough to receive a seat post. The upper end of that member is provided with a longitudinal slit 29 to facilitate clamping the seat post with a standard seat clamp 30, i.e., to facilitate contracting the diameter of the member 28 around the seat post. An extension post 31 having a diameter of the seat post is inserted into the other end of the member 28 and welded in position. That post, which may be a hollow cylindrical post as shown, is of an outer diameter selected to be inserted into the bicycle frame in place of the conventional seat post. The extension post is secured in place by a conventional seat clamp 32 (FIG. 1).

The branch 26 is welded to the member 28 at an angle that will permit the branch to extend forwardly just over the upper bar of the bicycle. A clamp 33 is secured to the bottom of the housing 25 by a nut and bolt assembly 34, as shown, or by welding. The pedal sprocket bearing assembly removed from the housing 14 (FIG. 1) will fit directly into the housing 25. Annular inserts 35 are removed from each side of the housing 14 (FIG. 1) after the pedal sprocket and bearings 36 are removed. Those inserts serve to provide bearing surfaces for the standard ball bearings shown.

To convert a standard bicycle to a high-ride bicycle with the bifurcated seat extension member 22 of FIG. 2, the seat is removed, and the extension member is put in place. Then the seat is placed on the extension member. Finally the pedal sprocket bearing assembly is transferred to the housing provided for it on the extension member and the bicycle chain is put in place using additional links as needed.

In the embodiment shown in FIG. 1, the seat has a rear support member 37 extending from the axles of the rear wheel. Such a support member is standard on many bicycles, and is available for virtually all bicycles. Consequently, if the seat is of the type requiring a rear support member, it may be provided as shown by securing the rear of the seat further up the support member. Such a support member is generally made from one continuous tube bent into an inverted U-shape. The ends of the tube are flattened and holes are drilled in the flattened portions to fit over the rear axle. Usually more than one set of holes are provided to permit some adjustment of the seat height, but such adjustment may not be sufficient for the height of the seat on the extension member 22. In that event, additional holes are drilled through the tube of the support member 37. Aside from that, no structural change is required in the bicycle. With a few simple tools, the standard bicycle can be quickly converted to a high ride bicycle, and just as quickly converted back to its standard arrangement.

The converted standard bicycle illustrated in FIG. 1 is provided with a high-rise handle bar 20 which normally causes the rider to ride with arms elevated. If such a high-rise handle bar is not already on the bicycle, one commercially available may be substituted. Upon conversion to a high-ride bicycle, the rider can lower his arms to about the same position they would be in if the standard bicycle had a more conventional handle bar instead of the high-rise handle bar shown. The gooseneck support 19 can be raised slightly (about one inch) in the housing 12 for final adjustment of the handle bar height.

It would be possible to provide an extension for the gooseneck support, to raise the high-rise handle bars, or to raise standard handle bar to the height of the high-rise handle bar shown, but such would not be advisable because the resulting high position of the handle bar would give the rider such great leverage that there would be serious risk of breaking the extension off. Consequently, high-rise handle bars are preferred for use with the present invention for converting a standard bicycle into a high-ride bicycle.

It is also preferred that a bicycle seat be used of the type that requires a rear support, as shown, but since the seat merely supports the weight of the rider, there is not the great risk that the seat extension member 22 will break, particularly when the smaller diameter member 31 is permitted to extend well into the hollow cylindrical member 28. For greater strength, a web could be welded between the member 28 and the branch 26 without departing from the present invention. In that event a rear support for the seat would not be required for even the heaviest riders.

Although particular embodiments of the invention have been described and illustrated herein, it is recognized that modifications and equivalents may readily occur to those skilled in the art and consequently it is intended that the claims be interpreted to cover such modifications and equivalents.

The embodiments of the invention in which an exclusive property or privilege is claimed are defined as follows:

1. A bifurcated seat extension member for converting a conventional bicycle, of the type having a frame with an upper bar between an upright seat-supporting member and a housing for a steering fork bearing assembly, to a high-ride bicycle, said seat extension being comprised of a hollow cylindrical member having a contractible clamping means around its upper end and a post at its lower end, said post being adapted to fit into said upright seat-supporting member of a conventional bicycle and to be secured by a contractible clamping means normally used to secure a conventional seat, and a branch extending forwardly from the hollow cylindrical member along the upper bar of the frame of said bicycle, said branch having a housing at the end thereof for a pedal sprocket bearing assembly, and means for securing said housing structure to said upper bar, whereby the conventional sprocket bearing assembly may be transferred to the housing at the end of the branch to complete conversion of the bicycle to a high-ride bicycle with the addition of a few links as necessary in the bicycle chain to reach around the sprocket in the new high-ride position.

2. A bifurcated seat extension as defined in claim 1 wherein said means for securing said housing structure to said upper bar is comprised of a clamp secured to the bottom of said housing, said clamp extending around said upper bar.

3. A bifurcated seat extension member as defined in claim 1 wherein said post at the lower end of said hollow cylindrical member is itself a smaller hollow cylindrical member having an outside diameter substantially equal to the inner diameter of the larger hollow cylindrical member, and the smaller cylindrical member extends into the larger cylindrical member.

* * * * *